(12) United States Patent
Hong et al.

(10) Patent No.: US 11,891,024 B2
(45) Date of Patent: Feb. 6, 2024

(54) WIPER ARM AND WIPER ASSEMBLY

(71) Applicant: Valeo Systèmes d'Essuyage, Le Mesnil Saint Denis (FR)

(72) Inventors: Haoyi Hong, Le Mesnil Saint Denis (FR); Jinlong Pu, Le Mesnil Saint Denis (FR); Xu Cheng, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 17/912,207

(22) PCT Filed: Mar. 11, 2021

(86) PCT No.: PCT/EP2021/056277
§ 371 (c)(1),
(2) Date: Sep. 16, 2022

(87) PCT Pub. No.: WO2021/185678
PCT Pub. Date: Sep. 23, 2021

(65) Prior Publication Data
US 2023/0159000 A1    May 25, 2023

(30) Foreign Application Priority Data
Mar. 17, 2020    (CN) .......................... 202010184724.1

(51) Int. Cl.
*B60S 1/52* (2006.01)
*B60S 1/34* (2006.01)
*B60S 1/40* (2006.01)

(52) U.S. Cl.
CPC ............. *B60S 1/522* (2013.01); *B60S 1/3415* (2013.01); *B60S 1/4006* (2013.01); *B60S 1/3425* (2013.01)

(58) Field of Classification Search
CPC .. B60S 1/52; B60S 1/522; B60S 1/524; B60S 1/3425; B60S 1/3415; B60S 1/4006
(Continued)

(56) References Cited

U.S. PATENT DOCUMENTS 5,016,312 A * 5/1991 Frimley ................ B60S 1/4087
15/250.04
5,842,251 A * 12/1998 LeFrançois et al. .. B60S 1/3497
15/250.04
(Continued)

FOREIGN PATENT DOCUMENTS

EP    1985513 A1    10/2008
EP    3002166 A1    4/2016
(Continued)

OTHER PUBLICATIONS

International Search Report and Written Opinion in corresponding International Application No. PCT/EP2021/056277, dated Jun. 7, 2021 (10 pages).
(Continued)

*Primary Examiner* — Gary K. Graham
(74) *Attorney, Agent, or Firm* — Osha Bergman Watanabe & Burton LLP

(57) ABSTRACT

A wiper arm and assembly are disclosed. The wiper arm has a wiper arm holder, connected at one end to an output portion of a driving mechanism for the wiper arm that drives the wiper arm to swing back and forth in an outward-swinging direction, an extension arm pivotally connected to the other end of the wiper arm holder, a wiper arm end member located on the side of the wiper arm opposite to the wiper arm holder and configured to hold a wiper blade, and a washer assembly having at least a first nozzle, and a first conduit in fluid communication with the first nozzle. The first nozzle includes a nozzle unit, a first connector for the first conduit, and a bridge channel located between them,
(Continued)

above the blade. The bridge channel is partially aligned with a segment of the wiper arm end member that is located above the blade.

12 Claims, 9 Drawing Sheets

(58) Field of Classification Search
USPC .................................................. 15/250.04
See application file for complete search history.

(56) References Cited

U.S. PATENT DOCUMENTS

| 2016/0121853 | A1 |   | 5/2016 | Uchiyama et al. |
| 2017/0080903 | A1 | * | 3/2017 | Kiyama ................. B60S 1/524 |
| 2017/0225661 | A1 | * | 8/2017 | Shimoyama ............. B60S 1/38 |
| 2019/0152442 | A1 |   | 5/2019 | Umeno et al. |

FOREIGN PATENT DOCUMENTS

| EP | 3040247 | * | 7/2016 |
| FR | 3043969 A1 |   | 5/2017 |
| JP | 2017206118 A |   | 11/2017 |
| WO | 2019/238223 A1 |   | 12/2019 |

OTHER PUBLICATIONS

Office Action issued in counterpart Japanese Application No. 2022-556023, dated Nov. 21, 2023 (8 pages).

* cited by examiner

WIPER ARM AND WIPER ASSEMBLY

TECHNICAL FIELD

The present invention relates to a wiper arm and a wiper assembly, which are especially used for motor vehicles.

BACKGROUND ART

Wiper assemblies play an important role in transport means, which are used to clean up rainwater or other dirt on a windshield that affects the driver's line of sight to ensure driving safety.

In the traditional wiper assemblies, a rain wiper system is separated from a washer system. The washer system is hidden below a front hood. When the windshield needs to be washed, the washer system sprays a washing liquid onto the surface of the windshield, and then the rain wiper system starts to work. In this case, after spraying the washing liquid, it is possible to cause a blind spot of the driver in a short time, thereby endangering driving safety. In addition, since the washing liquid is sprayed onto the entire surface, this causes unnecessary waste of the washing liquid.

SUMMARY OF THE INVENTION

Therefore, an object of the present invention is to propose a wiper arm, which can at least partially solve the above problems with a compact structure.

According to a first aspect of the present invention, a wiper arm is proposed, comprising: a wiper arm holder, which is connected at one end to an output portion of a driving mechanism for the wiper arm, the driving mechanism driving the wiper arm to swing back and forth in a return direction and an outward-swinging direction; an extension arm, which is pivotally connected to the other end of the wiper arm holder; a wiper arm end member, which is located on the side of the wiper arm opposite to the wiper arm holder and configured to hold a wiper blade; and a washer assembly, which sprays a washer fluid to a windshield and comprises at least a first nozzle and a first conduit in fluid communication with the first nozzle, the first nozzle spraying a cleaning fluid to an outward-swinging side of the wiper blade, and the conduit being directed in a longitudinal extension direction of the wiper arm, wherein the first nozzle comprises at least one nozzle unit, a first connector for the first conduit, and a bridge channel located between them, the bridge channel being located above the wiper blade and at least partially aligned with a segment of the wiper arm end member that is also located above the wiper blade.

"Aligned" should be understood as follows: from the perspective of the extension direction of the wiper arm, the projection of the bridge channel is partially overlapped with the projection of the related segment of the wiper arm end member. In particular, in the wiper arm in the mounted state, the bridge channel is not located between the wiper arm end member and the wiper blade below the side of the wiper arm end member facing the wiper blade. This can reduce the height dimension of the wiper arm, or there is no need to redesign the structure of related components. Therefore, the wiper arm has a compact structure and is cost-effective.

According to an advantageous embodiment of the present invention, the bridge channel is at a predetermined angle to a longitudinal extension direction of the wiper arm end member, in particular perpendicular to the longitudinal extension direction of the wiper arm end member.

According to an advantageous embodiment of the present invention, the first nozzle has an engagement segment such that the first nozzle is engaged at the wiper arm end member.

According to an advantageous embodiment of the present invention, the first nozzle is in the shape of a bend, and has a first bend segment and a second bend segment, the first bend segment is provided with the engagement segment and the bridge channel, and the nozzle unit is provided at the second bend segment.

According to an advantageous embodiment of the present invention, the engagement segment has an engagement opening, which accommodates a wall portion of the wiper arm end member.

According to an advantageous embodiment of the present invention, the bridge channel is located on the side facing the wiper arm holder.

According to an advantageous embodiment of the present invention, the first nozzle is provided with at least one penetration portion to allow air to pass through when a vehicle is travelling.

According to an advantageous embodiment of the present invention, the wiper arm end member has an engagement port, the engagement segment has notches on two sides, and edges of the wiper arm end member that define the engagement port are accommodated in the notches.

According to an advantageous embodiment of the present invention, the bridge channel is provided between the notches in the engagement segment.

According to an advantageous embodiment of the present invention, the first nozzle has a first nozzle unit that sprays a fluid towards one end of the wiper blade, a second nozzle unit that sprays the fluid towards the other, opposite end of the wiper blade, and a third nozzle unit that sprays the fluid towards the windshield.

According to an advantageous embodiment of the present invention, a fluid spraying direction of the corresponding nozzle unit of the first nozzle is adjustable.

According to an advantageous embodiment of the present invention, the washer assembly comprises a second nozzle and a second conduit in fluid communication with the second nozzle to spray a cleaning fluid to a return side of the wiper blade, wherein the second nozzle is mounted at the extension arm.

According to an advantageous embodiment of the present invention, the extension arm comprises a segment with a U-shaped cross-section, and the second nozzle is mounted at a side wall of the U-shaped segment of the extension arm.

According to an advantageous embodiment of the present invention, the second nozzle has a supporting arm for the first conduit.

According to an advantageous embodiment of the present invention, the second nozzle has a fourth nozzle unit that sprays a fluid towards one end of the wiper blade, a fifth nozzle unit that sprays the fluid towards the other, opposite end of the wiper blade, and a sixth nozzle unit that sprays the fluid towards the windshield.

According to an advantageous embodiment of the present invention, a fluid spraying direction of the corresponding nozzle unit of the second nozzle is adjustable.

According to another aspect of the present invention, a wiper assembly is proposed, comprising a wiper blade and a wiper arm as described above.

BRIEF DESCRIPTION OF THE DRAWINGS

The present invention is expounded in greater detail below with the aid of the drawings. In the drawings.

DETAILED DESCRIPTION OF EMBODIMENTS

Embodiments of the present invention will be described demonstratively below. As those skilled in the art should realize, the embodiments described may be amended in various ways without departing from the concept of the present invention. Thus, the accompanying drawings and the Description are in essence demonstrative and non-limiting. In the following text, identical drawing reference labels generally indicate functionally identical or similar elements.

Figure 1:
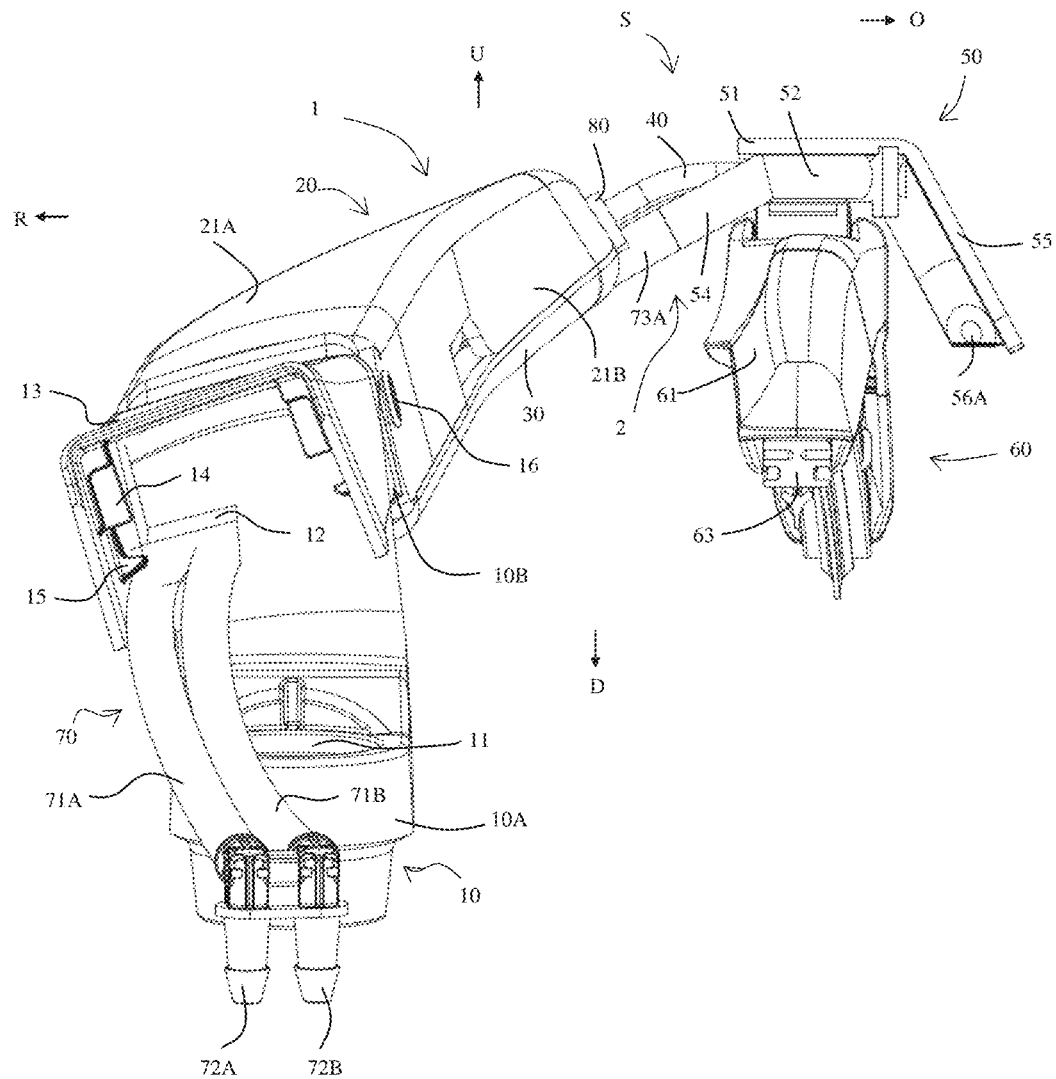
FIG. 1 schematically shows a perspective diagram of a first embodiment of a wiper assembly according to the present invention.

FIG. 1 schematically shows a diagram of a wiper assembly S according to a first embodiment of the present invention as viewed from a fixed end. The fixed end is connected to a driving portion (such as an output shaft) of a driving mechanism such as a motor for the wiper assembly. The wiper assembly S comprises a wiper arm 1 and a wiper blade 60, both of which have an elongated shape extending in a longitudinal direction and are detachably connected to each other in a known manner for wiping a windshield G.

Figure 2:
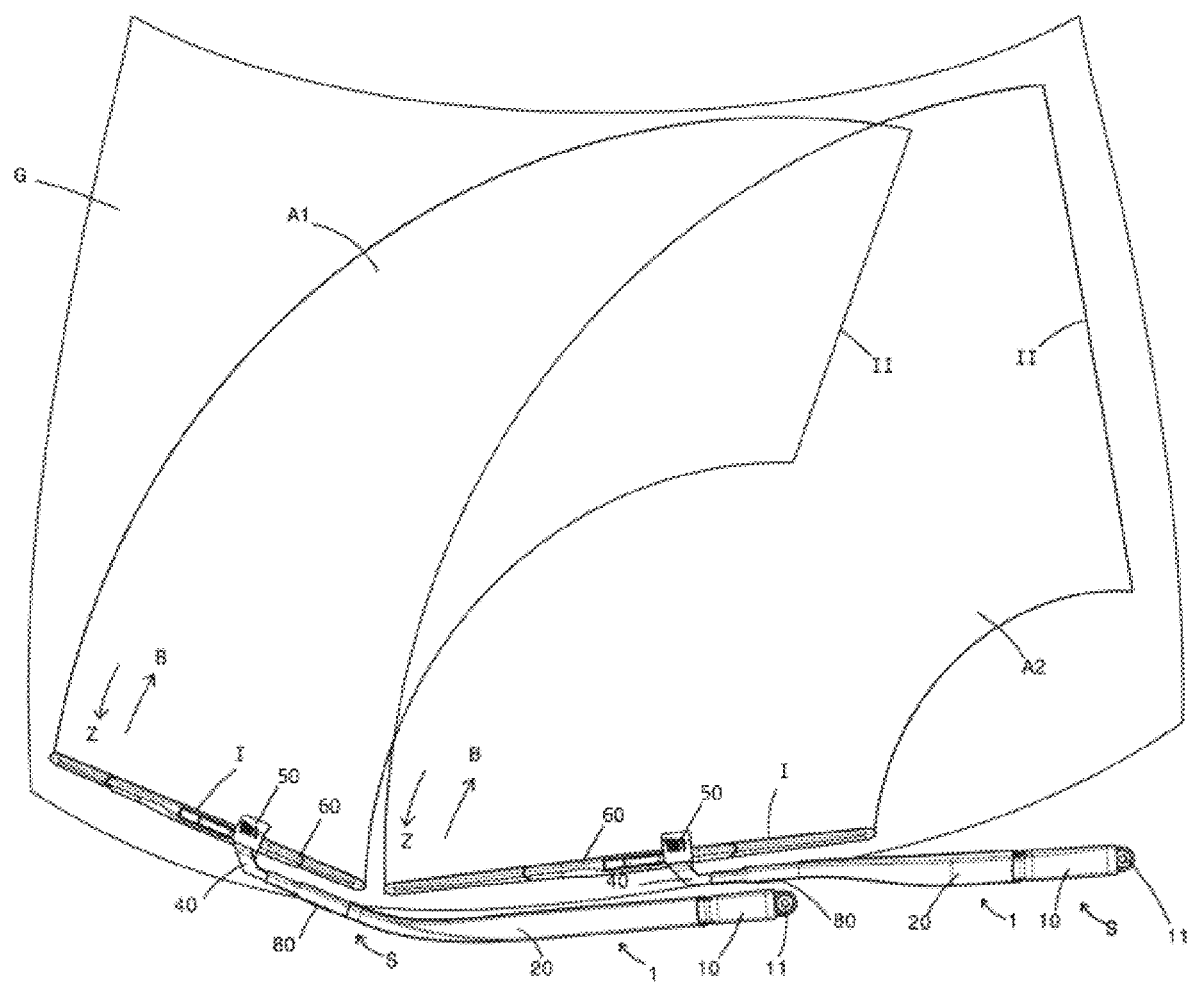
FIG. 2 schematically shows a diagram of the swing of the wiper assembly on a windshield.
Figure 3:
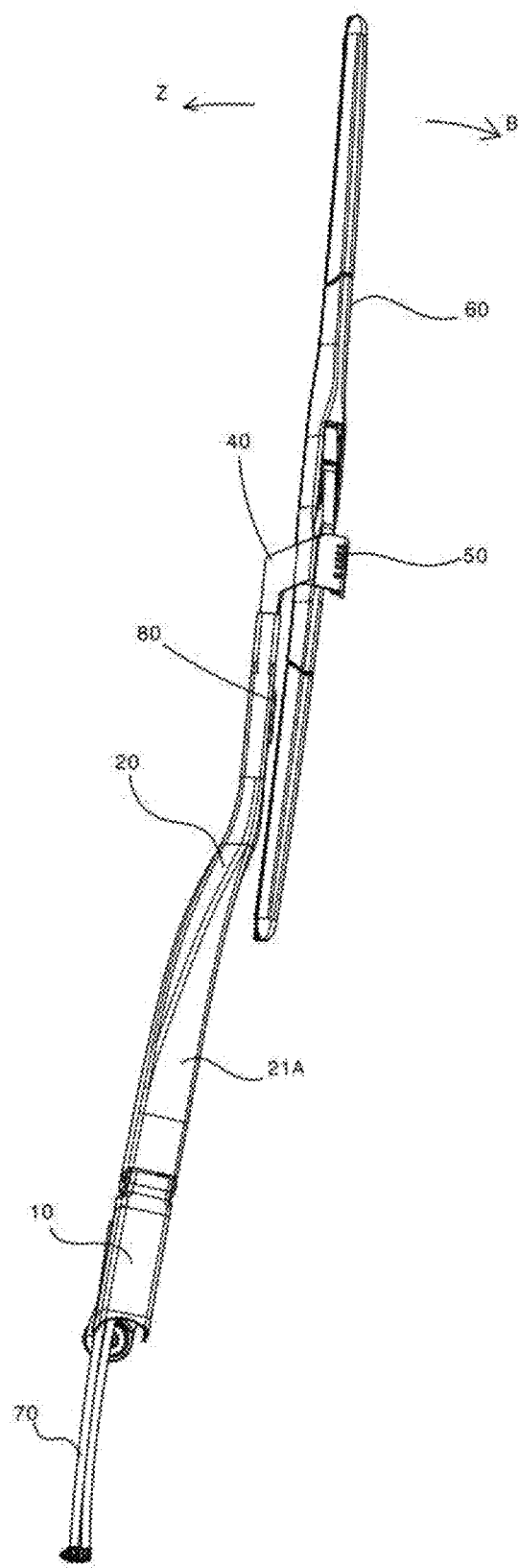
FIG. 3 shows another perspective diagram of the wiper assembly of FIG. 1.

For the operation of the wiper assembly S in FIG. 1, reference can be made to FIG. 2. FIG. 2 demonstratively shows that two wiper assemblies S are arranged side-by-side at the windshield G in a transverse direction of a vehicle. It should be noted that the number of wiper assemblies S arranged at the windshield G can be increased or decreased according to the size of the windshield G to be wiped. Each wiper assembly S can swing back and forth on the windshield G in an outward-swinging direction B and a return direction Z, thereby occupying a return limit position I and an outward-swinging limit position II, so that each wiper assembly S respectively wipes a wiping area A1, A2 between the two limit positions. It can be seen that in the case where a plurality of wiper assemblies are arranged, there may be an overlapped area between the corresponding wiping areas. Of course, the original position of the wiper assembly S, that is, the position occupied before being driven, may also be below the return limit position, so that when viewed from the front of the vehicle, the wiper assembly is covered by an engine hood of the vehicle, which facilitates the reduction of wind resistance acting on the wiper assembly when the vehicle is travelling and the wiper assembly is not required to work.

For ease of description, the side of the wiper assembly S facing the windshield G is called a lower side D, the side facing away from the windshield G is called an upper side U, the side facing the return limit position is called a return side R, and the side facing the outward-swinging limit position II called an outward-swinging side O. This is marked in FIG. 1.

The wiper arm 1 comprises: a wiper arm holder 10, which is connected at one end 10A, that is, the fixed end mentioned above, to an output portion of a driving mechanism for the wiper arm, the driving mechanism being, for example, a motor or comprising at least a motor; an extension arm 20, which is pivotally connected to the other end 10B of the wiper arm holder 10 and forms a longitudinally intermediate part of the wiper arm; a wiper arm end member 40, which is on the side of the wiper arm 1 opposite to the wiper arm holder 10 and is used to hold a wiper blade 60. In addition, the wiper arm 1 is also equipped with a washer assembly 2 for spraying a washer fluid to the windshield G. The washer assembly comprises a nozzle assembly and a conduit unit 70 for guiding the washer fluid, and the conduit unit is directed in a longitudinal extension direction of the wiper arm 1. The specific structure of the wiper arm will be further described below.

The wiper arm holder 10 is generally die-casted from aluminium or aluminium alloy. The end 10A on the fixed side of the wiper arm holder has a cylindrical hole 11 for a shaft of the driving mechanism not shown, wherein the shaft as the output portion of the driving mechanism is fixed against relative rotation in the cylindrical hole 11. In this way, the driving mechanism transmits the driving motion to the wiper arm via the shaft, so that the wiper arm can swing back and forth between the above two limit positions.

As can be seen in FIGS. 1 and 3 to 5, the wiper arm holder 10 is connected to the extension arm 20 via a pivot 16 at the other end 10B opposite to the end 10A. The pivot 16 passes through the wiper arm holder and the extension arm 20 transversely to the longitudinal extension direction of the wiper arm.

The wiper arm holder 10 is further provided with a channel 12 for the conduit unit 70 of the washer assembly 2. The channel can also be considered as extending in a longitudinal direction, that is, extending from one end facing the end 10A to the other end 10B and to the extension arm 20, such that the conduit unit 70 can be introduced into the extension arm 20.

In the example shown, the end of the channel 12 facing the end 10A is on the upper side of the wiper arm holder 10, and the other end thereof is on the lower side of the wiper arm holder 10 (see FIGS. 1 and 4), so that the conduit unit 70 enters the extension arm 20 from the lower side. It is also shown that the channel 12 is provided on the side of the wiper arm holder 10 facing the return side R.

It should be noted that the channel may also be arranged in the wiper arm holder in other suitable ways, as long as the conduit unit can be guided to the extension arm.

A cover 13 is arranged on the upper side of the wiper arm holder 10. For example, one end of the cover 13 is rotatably arranged at the pivoting portion of the wiper arm holder and the extension arm, and a side wall of the cover is provided with a rib 14 and a hook 15 for limiting purpose. For the state of the cover 13 shown in FIG. 1, it is only necessary to press the cover down to fix the cover 13 to the wiper arm holder 10. Therefore, the wiper arm holder and the conduit unit 70 are covered by the cover 13. If necessary, the cover 13 can extend above the cylindrical hole 11 to cover the output shaft in the cylindrical hole 11.

The extension arm 20 can also be considered as an elongated member, which is, for example, a sheet metal member. The extension arm 20 has a U-shaped cross-section substantially over its entire longitudinal extension length, wherein the opening of the U shape faces the lower side D. To this end, the extension arm 20 may have an upper wall portion 21A and side walls 21B, 21C on two sides of the upper wall portion. The two side walls respectively extend from an edge of the upper wall portion 21A towards the side facing the windshield G. The shape of the upper wall portion 21A should be designed according to aerodynamics to reduce the load of the wind acting on the extension arm when the vehicle is travelling.

The open side of the extension arm 20 may be equipped with a bottom cover 30 in at least some sections.

At the connection portion of the wiper arm holder 10 and the extension arm 20, the other end 10B of the wiper arm holder 10 is between inner walls of the side walls 21B, 21C of the extension arm 20. Two ends of the pivot 16 mentioned above that connects the wiper arm holder 10 and the extension arm 20 may be pressed against the outer walls of the side walls 21B, 21C in such a manner that the outer diameter of the two ends of the pivot 16 is greater than the inner diameter of perforations, not shown, in the side walls of the extension arm, so as to realize the rotation of the wiper arm holder 10 relative to the extension arm 20.

A spring element 23 is arranged in the extension arm 20 for applying a preload to the extension arm 20 to bias the extension arm in the direction of the windshield, such that a rubber strip 63 of the wiper blade 60 abuts against the windshield. A first end 23A of the spring element 23 is held at the extension arm or a member fixedly connected to the extension arm, and a second end 23B thereof is connected to the wiper arm holder, wherein, in a mounted state of the spring element 23, it is lengthened relative to the original state, thereby applying the preload. To this end, for example, at the edge of one side wall 21B of the extension arm 20, there is provided a tab 22A protruding towards the other side wall 21C. The tab has an opening 22B into which the first end 23A of the spring element 23 is hung. A peg 17 is arranged in a section 10B of the wiper arm holder 10 between the inner walls of the side walls 21B, 21C of the extension arm 20, and the second end 23B of the spring element 23 is hooked on the peg via a C-shaped member 24.

The peg 17 may be provided separately and then mounted at the section 10B. Alternatively, the peg 17 may also be integrally formed at the section 10B. The open side of the C-shaped member 24 faces the upper wall portion 21A of the extension arm 20.

In the mounted state of the spring element 23, the section 10B of the wiper arm holder 10 abuts against the extension arm 20 with the side thereof facing the upper wall portion 21A of the extension arm 20 under the action of the spring element. The section 10B may be divided into a first part 10B1 and a second part 10B2 in a width direction of the wiper arm holder 10, wherein a front end of the first part 10B1 is U-shaped, so that when the extension arm is rotated around the pivot 16 into the drawing of FIG. 5, that is, the direction of rotation points to the inside of the drawing of FIG. 5, to rotate the extension arm in a direction moving away from the windshield in order to replace the wiper, the C-shaped member 24 is prevented from touching the front end of the first part 10B1. In other words, the provided spring element should not hinder the relative movement of the wiper arm holder 10 and the extension arm 20 in a predetermined direction. The second part 10B2 forms a part of the channel 12 for the conduit unit 70, that is, the conduit unit 70 enters the extension arm with this second part 10B2.

The conduit unit 70 is accommodated in the extension arm 20 in an internal space formed by the upper wall portion and the two side walls of the extension arm 20. In order to prevent the conduit unit from falling out of the extension arm 20, the edges of the side walls 21B, 21C may also be provided with supporting sheets 22A protruding towards the inner space, and the arrangement positions and number of the supporting sheets may be arranged according to requirements.

The extension arm 20 is fixedly connected to the wiper arm end member 40 at the other end 25A thereof. For example, the extension arm at least partially surrounds a fixing segment 41 of the wiper arm end member 40 at the end 25A, see FIGS. 6 and 7. The wiper arm end member will be further described below.

Figure 4:
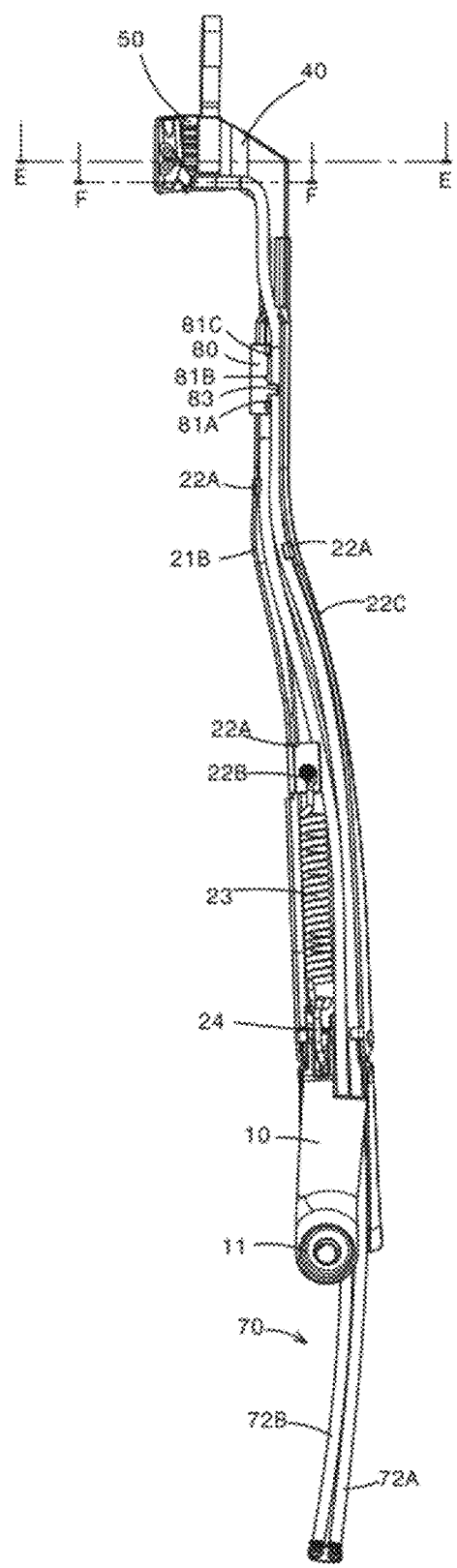
FIG. 4 shows a bottom view of a wiper arm of the wiper assembly of FIG. 1.
Figure 5:
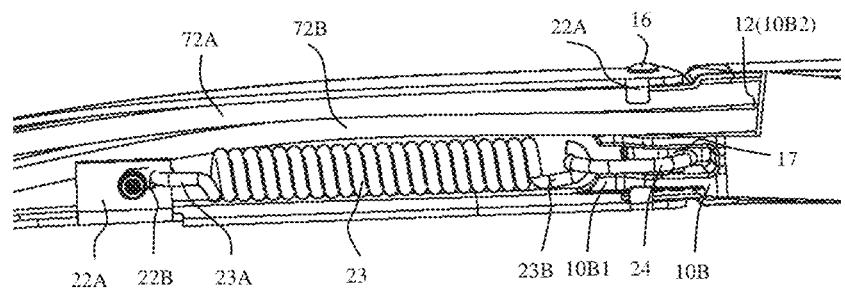
FIG. 5 shows the connection between a wiper arm holder and an extension arm of the wiper arm of FIG. 4.

In addition, as can be seen particularly clearly from FIG. 4, especially for the extension arm 20, the spring element 23 occupies some sections of the extension arm 20 on the side facing the wiper arm holder 10, and the extension arm 20 has a gradually narrowing width over its entire length.

The wiper arm end member 40 may also be a sheet metal member, which has a fixing segment 41 connected to the extension arm 20, an intermediate segment 42 and a mounting segment 43. The mounting segment is used to mount the wiper blade 60.

In the example shown, the mounting segment 43 is in the form of a U-shaped hook. However, the mounting segment 43 may also have other forms, including but not limited to a J-shaped hook, an N-shaped hook, an E-shaped hook, a bayonet-type chuck, an internal locking chucks, a side locking chuck, etc. The corresponding connection portion of the wiper blade has a structure that matches the corresponding mounting segment.

The wiper arm end member 40 also extends in the longitudinal direction as a whole, but the fixing segment 41 and the mounting segment 43 are staggered in a direction transverse to the longitudinal direction, and the staggered segment forms the intermediate segment 42. Therefore, the wiper arm end member 40 can be considered as a crank-shaped elongated member.

A nozzle of the nozzle assembly of the washer assembly 2 of the wiper arm may be mounted at the extension arm 20 and/or the wiper arm end member 40. In the example shown, two nozzles respectively mounted at the extension arm 20 and the wiper arm end member 40 are shown, and they are used to spray a cleaning fluid, such as a windshield washer fluid, onto the windshield towards the return side and the outward-swinging side of the wiper blade when the wiper blade swings in the outward-swinging direction B and in the return direction Z.

Figure 8:
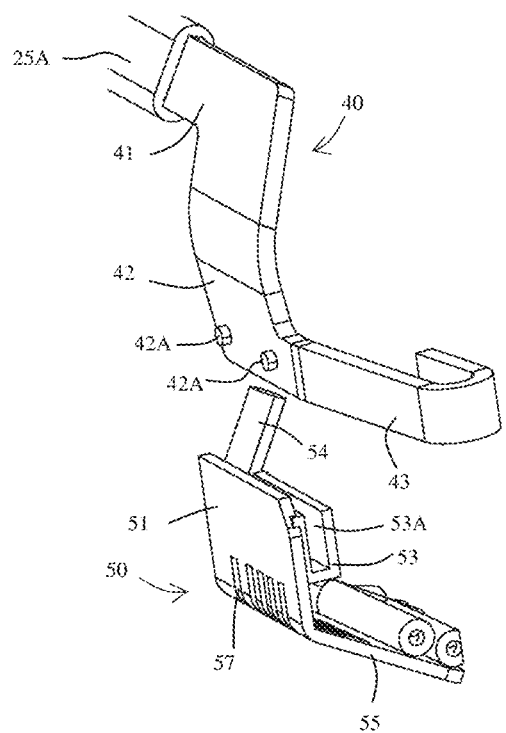
FIG. 8 shows a diagram of a front end section of the wiper arm of FIG. 4, showing the first nozzle and the second nozzle of a washer assembly, with the first nozzle being in a state to be mounted.
Figure 9:
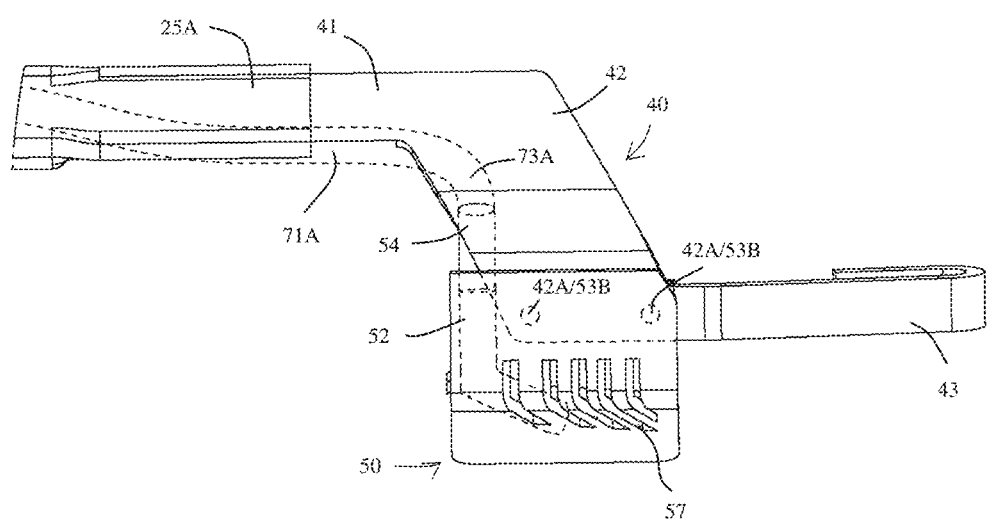
FIG. 9 schematically shows a top view of the front end section of the wiper arm of FIG. 4.
Figure 10:
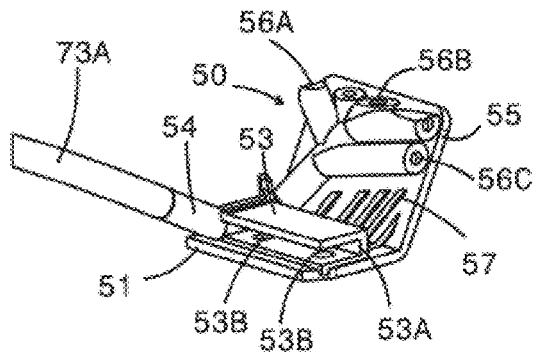
FIG. 10 schematically shows a perspective diagram of the first nozzle.

The first nozzle 50 mounted at the wiper arm end member 40 is shown in FIGS. 8-10. FIGS. 8 and 9 show the first nozzle 50 in a detached state and a mounted state, respectively. FIG. 10 shows a perspective view of the first nozzle 50 alone.

The first nozzle 50 is arranged on the outward-swinging side of the wiper arm end member 40. The first nozzle 50 comprises at least one nozzle unit, a first connector 54 for the end 73A of a first conduit 71A, and a bridge channel 52 located between them.

The first nozzle 50 is in the shape of a bend, and has a first bend segment 51 and a second bend segment 55, wherein the bridge channel 52 is provided at the first bend segment 51, and the nozzle unit is provided at the second bend segment 55.

In order to mount the first nozzle 50 at the wiper arm end member 40, the first nozzle 50 has an engagement segment 53 with an engagement opening 53A. The engagement opening is provided in the first bend segment 51 of the first nozzle 50. A mechanical connection may be established directly between the first nozzle 50 and the wiper arm end member 40. To this end, the wiper arm end member 40 is formed with a first protrusion 42A on a surface of the intermediate segment 42 thereof. Here, two first protrusions 42A are shown demonstratively. The first nozzle 50 is provided with a corresponding number of first recesses 53B in the engagement opening thereof. In addition, the opening width of the engagement opening 53A corresponds to the thickness of a wall portion of the intermediate segment 42 of the wiper arm end member. During mounting, it is only necessary to push the engagement opening 53A of the first nozzle 50 to the intermediate segment 42 of the wiper arm end member 40, so that the first protrusions 42A occupy the correct positions in the first recesses 53B (see FIG. 9). Here, it can be considered that the first nozzle 50 is mounted at the wiper arm end member 40 in a snap-fit manner.

In this example, the first nozzle 50 has a first nozzle unit 56A that sprays a fluid towards one end of the wiper blade, a second nozzle unit 56C that sprays the fluid towards the other, opposite end of the wiper blade, and a third nozzle unit 56B that sprays the fluid towards the windshield G. Preferably, a fluid spraying direction of the corresponding nozzle unit of the first nozzle 50 is adjustable.

The bridge channel 52 may be provided on a side portion of the engagement segment 53, and at least partially aligned with the engagement segment in the thickness direction of the first bend segment 51. In the example shown, the side of the bridge channel 52 facing the wiper blade does not extend beyond the side of the engagement segment 53 facing the wiper blade. In the mounted state of the first nozzle 50, the bridge channel 52 faces the wiper arm holder 10.

The bridge channel 52 may be at a predetermined angle relative to the longitudinal extension direction of the wiper arm, in particular the wiper arm end member 40 of the wiper arm, so as to match the shape of the wiper arm end member itself. For example, the bridge channel 52 may be perpendicular to the longitudinal extension direction of the wiper arm end member 40 to match the situation where the fixing segment 41 and the mounting segment 43 of the wiper arm end member are staggered.

The first nozzle 50 is further provided with at least one penetration portion 57 to allow air to pass through when the vehicle is travelling. It can be seen in the example shown that the penetration portion 57 is partially provided at the first bend segment 51 and partially provided at the second bend segment 55.

Figure 11:
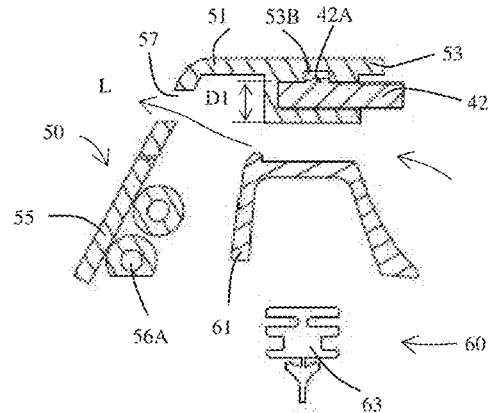
FIG. 11 shows a cross-sectional view of the wiper arm of FIG. 4 along a line E-E.
Figure 12:
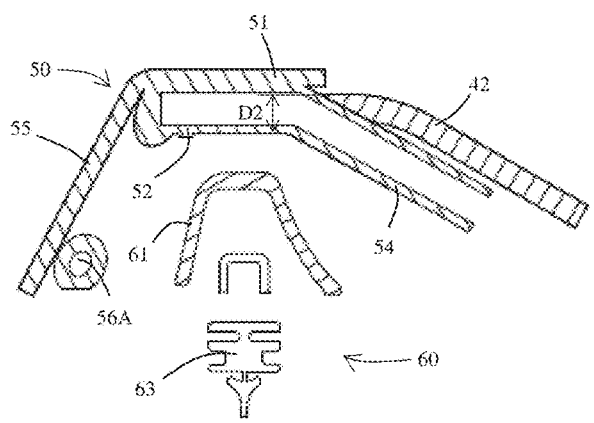
FIG. 12 shows a cross-sectional view of the wiper arm of FIG. 4 along a line F-F.

FIGS. 11 and 12 show cross-sectional views of the wiper arm of FIG. 4 along lines E-E, F-F, wherein the wiper blade is additionally shown.

It can be seen in FIG. 11 that the first nozzle 50 is held at the wall portion of the intermediate segment 42 of the wiper arm end member 40 via the engagement segment 53, wherein the first protrusion 42A is located in the first recess 53B. In order to further facilitate the introduction of the intermediate segment 42 into the engagement opening 53A of the engagement segment 53, the side of the first protrusion 42A facing the engagement opening 53A in an engagement direction may be bevelled, such that the first protrusion 42A has a bevel.

The arrow L schematically shows an airflow flowing towards the windshield through the penetration portion 57 of the first nozzle 50, which facilitate the reduction of the load acting on the wiper arm.

In FIG. 11, the distance from the upper side of the intermediate segment 42 to the lower side of the engagement segment 53 is indicated by D1. In FIG. 12, the distance from the upper side of the intermediate segment 42 to the lower side of the bridge channel 52 is indicated by D2. Preferably, D2 is not greater than D1.

After the nozzle is mounted on the wiper arm end member, viewed from the vertical direction in FIGS. 11 and 12, the bridge channel 52 is located above the wiper blade 60 and is at least partially aligned with a segment (here, the intermediate segment) of the wiper arm end member 40 that is also located above the wiper blade 60. The structural size of the corresponding portion is not excessively increased due to the provision of the bridge channel, but there is still a space left between the bridge channel and the wiper blade. Therefore, the overall size and structure of the wiper assembly are not significantly affected, and the nozzle can be mounted with as few modifications as possible. The wiper blade itself does not need to be modified, especially an upper portion 61 of the blade.

The wiper arm 1 may further have another nozzle for spraying the cleaning fluid towards the return side of the wiper arm when the wiper assembly swings in the return direction Z.

Figure 6:
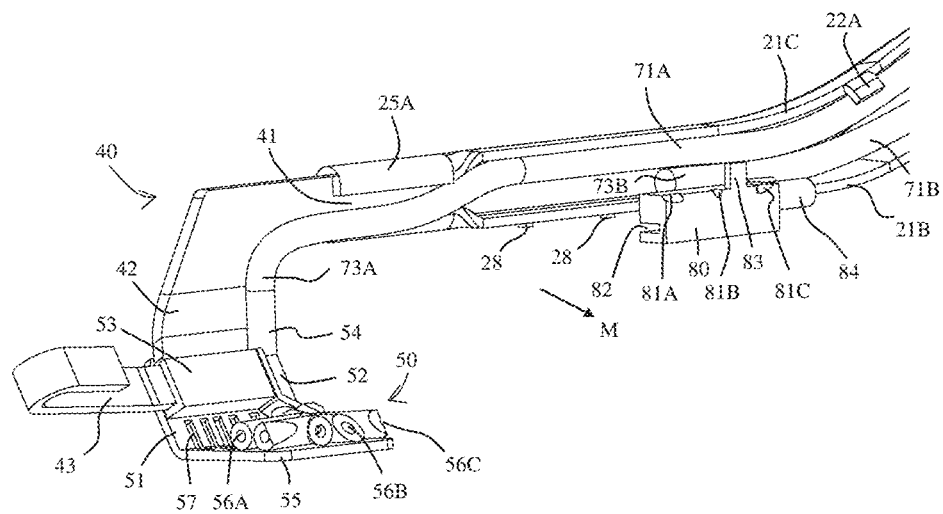
FIG. 6 shows a diagram of a front end section of the wiper arm of FIG. 4, showing a first nozzle and a second nozzle of a washer assembly, with the second nozzle being in a state to be mounted.
Figure 7:
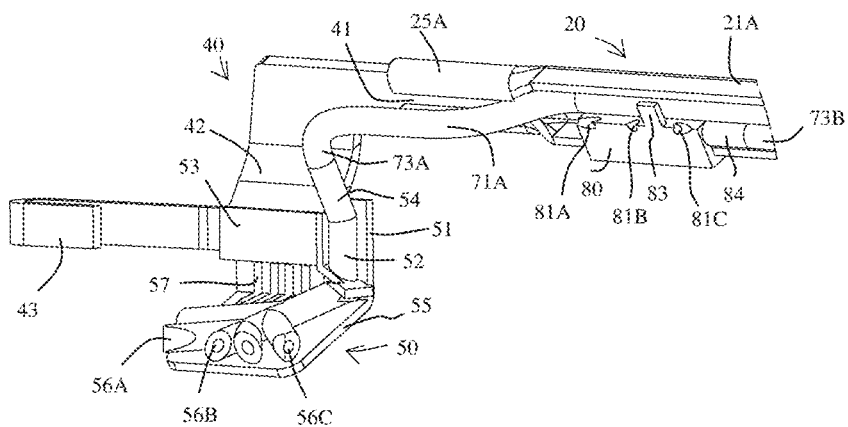
FIG. 7 shows a diagram of a front end section of the wiper arm of FIG. 4, showing the mounted first nozzle and second nozzle of a washer assembly.

FIGS. 6 and 7 demonstratively show a detached state and a mounted state of the second nozzle 80 mounted at a side wall of the extension arm 20, for example, the side wall 21B on the outward-swinging side. A second protrusion 28 is formed on the side wall 21B. Here, two second protrusions are shown demonstratively. The second nozzle 80 has a second mounting opening 82 mounted at the side wall 21B, wherein the second mounting opening 82 is provided with second recesses, not shown, that match the second protrusions 28, and the opening width of the second mounting opening 82 corresponds to the thickness of the side wall 21B. During mounting, it is only necessary to push the mounting opening 82 of the second nozzle 50 to the side wall 21B, so that the second protrusions occupy the correct positions in the second recesses.

The second nozzle 80 has a connector 84 for the end 73B of a second conduit 71B in fluid communication with the second nozzle.

The second nozzle 80 further has a fourth nozzle unit 81A that sprays a fluid towards one end of the wiper blade, a fifth nozzle unit 81C that sprays the fluid towards the other, opposite end of the wiper blade, and a sixth nozzle unit 81B that sprays the fluid towards the windshield G.

The second nozzle 80 further has a supporting arm 83 for the first conduit 71A.

Preferably, a fluid spraying direction of the corresponding nozzle unit of the second nozzle 80 is adjustable.

Figure 13:
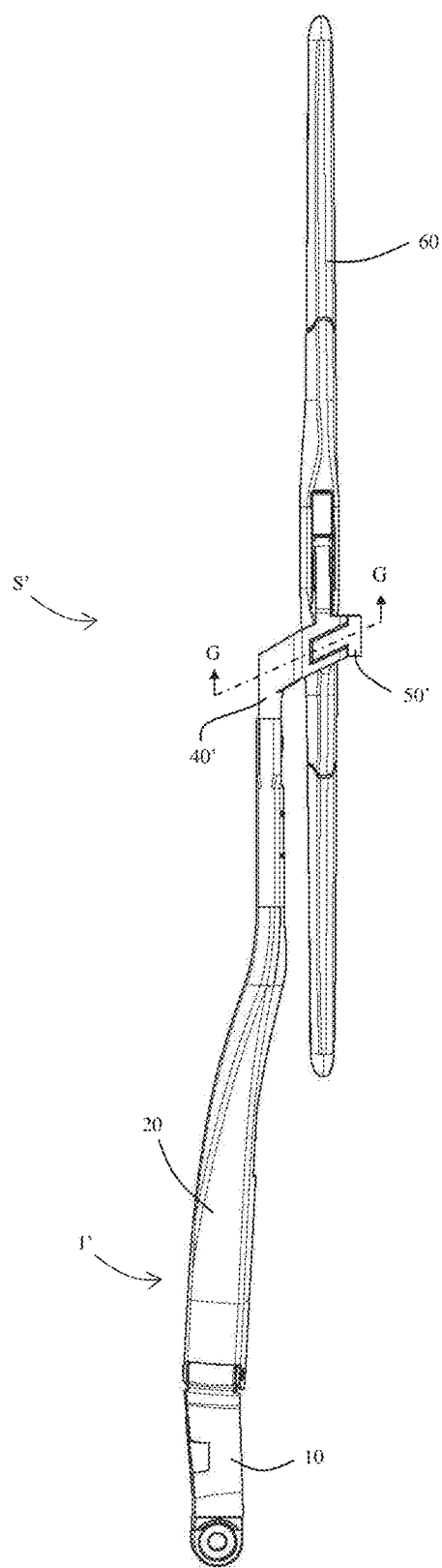
FIG. 13 schematically shows a perspective diagram of a second embodiment of a wiper assembly according to the present invention.

A perspective diagram of a second embodiment of a wiper assembly according to the present invention is schematically shown in FIG. 13. The difference between the wiper assembly S' of the second embodiment and the wiper assembly S of the first embodiment lies in the mounting method of the first nozzle. To avoid repetition, only this will be described below, and for the other parts, reference can be made to the description above. Single quotes are added to the reference signs.

The wiper arm 1' of the wiper assembly S' also has a wiper arm end member 40' and a first nozzle 50', the first nozzle being mounted on the wiper arm end member.

Figure 14:
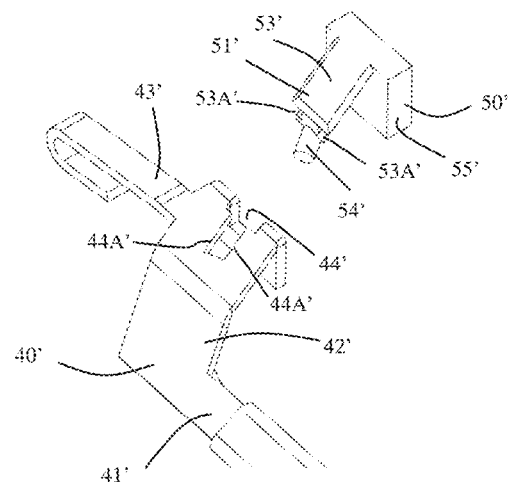
FIG. 14 shows an exploded diagram of a blade connection side section of a wiper arm of the wiper assembly of FIG. 13.

As can be seen in particular from the exploded diagram of FIG. 14, the wiper arm end member 40' has a fixing segment 41' fixed to the extension arm, a mounting segment 43' for mounting the wiper blade, and an intermediate segment 42' between them. An engagement port 44' is provided in the intermediate segment, which is formed by means of blanking, for example.

The first nozzle 50' also has a first section 51' and a second section 55'. The engagement segment 53' is formed in the first section 51', and the nozzle unit is provided at the second section 55'. The engagement segment 53' has notches 53A' on two sides. In the mounted state of the first nozzle (see FIG. 13), the corresponding two edges 44A' of the engagement port 44' of the intermediate segment 42' are accommodated in the notches 53A'. Of course, an anti-drop structure is also provided to prevent the first nozzle from separating from the wiper arm end member. For example, the anti-drop structure may be provided with corresponding structures in the first nozzle and the wiper arm end member similar to the combination of the protrusions and the recesses described above. Of course, it can also be implemented by means of adhesive bonding or other suitable methods.

The first section 51' of the first nozzle 50' is also formed with a connector 54' connected to a conduit for the nozzle and a bridge channel 52' of the nozzle unit not shown. The bridge channel 52' is located between the two notches 53A'. After the wiper blade 60 is mounted on the wiper arm 1', the connector 54' of the first nozzle 50' and the nozzle unit are located on two sides relative to the wiper blade, and the bridge channel 52' is located above the wiper blade.

Figure 15:
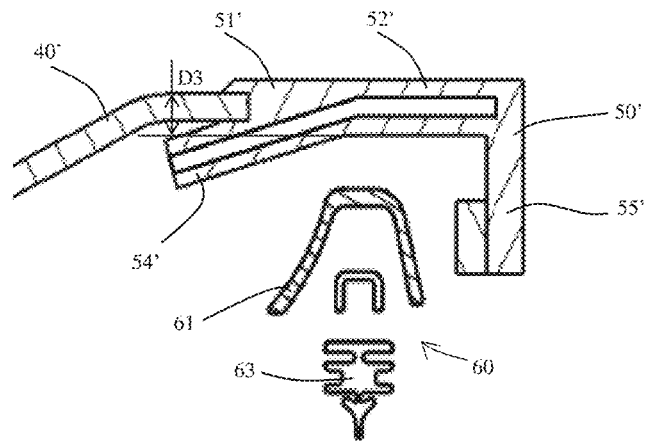
FIG. 15 shows a cross-sectional view of the wiper assembly of FIG. 13 along a line G-G.

In FIG. 15, the distance between the upper side of the intermediate segment and the lower side of the bridge channel is indicated by D3. Similar to the first embodiment, D3 is preferably not greater than the distance from the upper side of the intermediate segment to the lower side of the engagement segment. More preferably, the lower side of the bridge channel is the lower side of the engagement segment. In this embodiment, after the first nozzle 50' is mounted, the bridge channel, which is located above the wiper blade, is at least partially aligned with a segment of the wiper arm end member that is also located above the wiper blade, so that the structural size of the corresponding portion is not excessively increased due to the provision of the bridge channel. Therefore, the overall size and structure of the wiper assembly are not significantly affected, and the nozzle can be mounted with as few modifications as possible.

It should be noted that the first nozzle 50 and the second nozzle 80 described above of the washer assembly may also be used alternatively, and conduits for the nozzles are respectively provided with adapters 72A, 72B at the ends thereof.

It should be noted that the wiper arm end member and the extension arm may also be connected indirectly, that is, via a further component.

The present invention, instead of being limited to the above-described structure, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. A wiper arm, the wiper arm comprising:
   a wiper arm holder, which is connected at one end to an output portion of a driving mechanism for the wiper arm, the driving mechanism being configured to drive the wiper arm to swing back and forth in a return direction and an outward-swinging direction;
   an extension arm, which is pivotally connected to another end of the wiper arm holder;
   a wiper arm end member, which is located on a side of the wiper arm opposite to the wiper arm holder and configured to hold a wiper blade; and
   a washer assembly, which is configured to spray a washer fluid to a windshield and comprises at least a first nozzle and a first conduit in fluid communication with the first nozzle, the first nozzle spraying the washer fluid to an outward-swinging side of the wiper blade, and the first conduit being directed in a longitudinal extension direction of the wiper arm,
   wherein the first nozzle comprises:
      at least one nozzle unit,
      a first connector for the first conduit,
      a bridge channel located between the at least one nozzle unit and the first connector and fluidly connecting the first connector and the first nozzle, and
      an engagement section, wherein the engagement section is engaged at the wiper arm end member;
   wherein the bridge channel is located above the wiper blade, between a plurality of notches of the engagement section on opposite facing sides thereof, and at least partially aligned with a segment of the wiper arm end member that is also located above the wiper blade.

2. The wiper arm according to claim 1, wherein the first nozzle is provided with at least one penetration portion to allow air to pass through when a vehicle is travelling.

3. The wiper arm according to claim 1, wherein the first nozzle is in the shape of a bend, and has a first bend segment and a second bend segment, the first bend segment is provided with the engagement segment and the bridge channel, and the at least one nozzle unit is provided at the second bend segment.

4. The wiper arm according to claim 1, wherein the wiper arm end member has an engagement port, and edges of the wiper arm end member that define the engagement port are accommodated in the notches.

5. The wiper arm according to claim 1 wherein the first nozzle comprises the at least one nozzle unit, including a first nozzle unit that sprays a fluid towards one end of the wiper blade, a second nozzle unit-that sprays the fluid towards the other, opposite end of the wiper blade, and a third nozzle unit that sprays the fluid towards the windshield.

6. The wiper arm according to claim 5, wherein a fluid spraying direction of a corresponding nozzle unit of the first nozzle is adjustable.

7. The wiper arm according to claim 5, wherein the washer assembly comprises a second nozzle and a second conduit in fluid communication with the second nozzle to spray a cleaning fluid to a return side of the wiper blade, wherein the second nozzle is mounted at the extension arm.

8. The wiper arm according to claim 7, wherein the extension arm comprises a segment with a U-shaped cross-section, and the second nozzle is mounted at a side wall of the U-shaped segment of the extension arm.

9. The wiper arm according to claim 8, wherein the second nozzle has a supporting arm for the first conduit.

10. The wiper arm according to claim 8, wherein the second nozzle has a fourth nozzle unit that sprays a fluid towards one end of the wiper blade, a fifth nozzle unit that sprays the fluid towards the other, opposite end of the wiper blade, and a sixth nozzle unit that sprays the fluid towards the windshield.

11. The wiper arm according to claim 10, wherein a fluid spraying direction of a corresponding nozzle unit of the second nozzle is adjustable.

12. A wiper assembly, comprising: a wiper blade and a wiper arm according to claim 1.

* * * * *